(12) United States Patent
De Paoli et al.

(10) Patent No.: US 10,981,438 B2
(45) Date of Patent: *Apr. 20, 2021

(54) GLAZING COMPRISING AT LEAST ONE PROFILED BEAD FOR THE CONNECTION BETWEEN TWO WINDOWS AND WINDOW FOR SUCH GLAZING

(71) Applicant: SAINT-GOBAIN GLASS FRANCE, Courbevoie (FR)

(72) Inventors: Martial De Paoli, Cuts (FR); Laurent Lamoureux, Ribecourt-Dreslincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/495,731

(22) PCT Filed: Mar. 29, 2018

(86) PCT No.: PCT/FR2018/050764
§ 371 (c)(1),
(2) Date: Sep. 19, 2019

(87) PCT Pub. No.: WO2018/178574
PCT Pub. Date: Oct. 4, 2018

(65) Prior Publication Data
US 2020/0055381 A1   Feb. 20, 2020

(30) Foreign Application Priority Data

Mar. 30, 2017  (FR) ..................... 1752694

(51) Int. Cl.
*E06B 3/96* (2006.01)
*B60J 10/70* (2016.01)
*B60J 1/00* (2006.01)

(52) U.S. Cl.
CPC ............... *B60J 10/70* (2016.02); *B60J 1/001* (2013.01)

(58) Field of Classification Search
CPC ... B60J 1/001; B60J 10/70; B60J 10/23; B60J 10/16; B60J 10/40; B32B 3/06;
(Continued)

(56) References Cited

U.S. PATENT DOCUMENTS 5,300,171 A * 4/1994 Braun .................... C09J 183/04
156/249
6,055,783 A * 5/2000 Guhl ....................... C03C 27/06
156/109

(Continued)

FOREIGN PATENT DOCUMENTS

FR  2 916 690 A1  12/2008
FR  2 952 144 A1   5/2011
(Continued)

OTHER PUBLICATIONS

International Search Report as issued in International Patent Application No. PCT/FR2018/050764, dated Jun. 5, 2018.

*Primary Examiner* — Chi Q Nguyen
(74) *Attorney, Agent, or Firm* — Pillsbury Winthrop Shaw Pittman LLP

(57) ABSTRACT

A glazing includes two contiguous windows, the glazing including on the one hand two profiled bodies situated face to face and each situated in contact against a part of the edge surface of one of the windows and on the other hand, one or two exterior covering(s) that is (or each is) situated farther toward the exterior than the profiled bodies and against a part of the edge surface of the windows and which (each of which) has an exterior face that is situated in continuity with
(Continued)

the exterior face of the window, the exterior covering(s) being flexible, with a Shore A hardness between 45 and 90 inclusive.

20 Claims, 3 Drawing Sheets

(58) Field of Classification Search
CPC .......... B32B 17/10036; B32B 2315/08; B32B 2605/006; B32B 2605/08; B32B 17/10064
USPC .............. 52/204.57, 204.62, 786.1, 204.591; 156/109
See application file for complete search history.

(56) References Cited

U.S. PATENT DOCUMENTS

| | | | | |
|---|---|---|---|---|
| 6,364,404 B1* | 4/2002 | De Paoli | ................. | B60J 1/006 296/201 |
| 6,460,917 B2* | 10/2002 | De Paoli | ................. | B60J 1/006 296/201 |
| 6,886,297 B1* | 5/2005 | Crandell | ................. | E06B 3/64 52/172 |
| 10,239,386 B2* | 3/2019 | De Paoli | ........... | B32B 17/10036 |
| 2008/0295425 A1* | 12/2008 | Farag | ................ | B32B 17/10055 52/235 |
| 2011/0047905 A1* | 3/2011 | Erner | ....................... | B60J 10/70 52/208 |
| 2013/0224412 A1* | 8/2013 | Muta | ..................... | B32B 27/302 428/35.7 |
| 2014/0144313 A1* | 5/2014 | Bertolini | ................ | F41H 5/263 89/36.08 |
| 2014/0332519 A1 | 11/2014 | Sakamoto et al. | | |
| 2014/0355107 A1* | 12/2014 | Taima | .................... | B29C 48/40 359/359 |
| 2015/0158274 A1* | 6/2015 | Yabuki | ................. | B32B 27/365 428/328 |
| 2017/0028686 A1* | 2/2017 | Wilson | ..................... | B32B 7/05 |

FOREIGN PATENT DOCUMENTS

| | | |
|---|---|---|
| GB | 2 047 784 A | 12/1980 |
| WO | WO 2006/064153 A1 | 6/2006 |
| WO | WO 2010/006257 A2 | 1/2010 |

* cited by examiner

GLAZING COMPRISING AT LEAST ONE PROFILED BEAD FOR THE CONNECTION BETWEEN TWO WINDOWS AND WINDOW FOR SUCH GLAZING

CROSS-REFERENCE TO RELATED APPLICATIONS

This application is the U.S. National Stage of PCT/FR2018/050764, filed Mar. 29, 2018, which in turn claims priority to French patent application number 1752694 filed Mar. 30, 2017. The content of these applications are incorporated herein by reference in their entireties.

FIELD

The present invention concerns glazing, and in particular vehicle glazing, comprising two contiguous windows, in particular with at least one, or even the two, laminated windows then comprising an exterior layer of glass, an interior layer of glass and a plastic material interlayer situated between said two layers of glass, each window having an exterior face, an edge surface and an interior face.

BACKGROUND

Known in the prior art, in particular in the international patent application: WO 2006/064153, are window juxtaposition solutions, in particular for vehicles, where a first window and a second window juxtaposed to or contiguous with the first are assembled side by side by means of an assembly system.

However, it is difficult to produce a flush join with an identical esthetic appearance all along a longitudinal edge of the two windows.

More recently there has been proposed in the international patent application No. WO 2010/006257 a first window including a reinforced profiled bead that has one, or even two, lip(s) that come into contact with a contiguous second window.

However, this solution does not make it possible to produce an effective flush join between the two windows.

SUMMARY

The glazing according to the invention includes along at least one part of at least one edge of a first window a specific profiled bead to enable the assembly of a second window contiguous with the first along that edge.

An object of the present invention is to remedy disadvantages of the prior art by proposing a simple and reliable joining solution between two windows, whether each window is monolithic or laminated, in order to make it possible to produce a flush double join at the location of each exterior face/edge surface intersection of each of the two windows.

The means proposed by the invention participate actively in the join between the two windows in order to prevent any contact between those windows and between a window and the adjacent body rabbet during assembly (that is to say mounting) of the windows in the window opening that they have to close, as well as throughout the service life of the glazing. They can moreover make it possible:

to improve the aerodynamic coefficient by participating in the reduction of the air penetration coefficient, and/or
to reduce the aerodynamic noise of the joins, and/or
to reduce the penetration of dust or fluids farther into the interior than the exterior face of the windows, and/or
to compensate small clearances or small manufacturing discrepancies from one window to the other for the same design of window, and/or
to create a discreet esthetic join when the exterior covering is chosen in a dark color, close to the color of the edges of the window, or to the contrary a join that attracts the eye when the exterior covering is chosen with a light or metallic appearance (for example a chrome-plated appearance).

One particular object that is sought is to make possible an effective join between the two windows with the aid of a single profiled bead integrating all the elements necessary for this join; the join is therefore simpler to produce.

The present invention therefore relates to glazing, and in particular vehicle glazing, in accordance with claim 1. The dependent claims describe advantageous features.

This glazing comprises two contiguous windows, notably with at least one, or even the two, laminated window(s) comprising an exterior layer of glass, an interior layer of glass and a plastic material interlayer situated between said two layers of glass, each window having an exterior face, an edge surface and an interior face.

This glazing is remarkable in that it includes:

on the one hand two profiled bodies situated face to face and each situated in contact against a part of the edge surface of one of said windows [whilst being at a distance from the other body/without direct contact], and on the other hand, one, or two, exterior covering(s) that is (or are) (each) situated farther to the exterior than said profiled bodies and against a part of the edge surface of said windows and has (or each has) an exterior face that is situated in continuity with said exterior face of said window, said exterior covering(s) being flexible, having a Shore A hardness between 45 and 90 inclusive, or even between 55 and 85 inclusive.

The presence of two separate (that is to say materially distinct) profiled members and the (or the two) exterior covering(s) is seen in particular when the glazing is observed in cross section at the junction between the two windows.

Two profiled bodies may be constituted of the same material; the (or the two) exterior covering(s) is (or are) constituted of a material that is different from that of the two profiled bodies; this material is preferably the same for both exterior coverings. This material of the exterior covering(s) is more flexible than that of the profiled body or bodies and this flexibility is expressed here by a relatively low Shore A hardness.

The two profiled bodies and the exterior covering(s) are part of the profiled glazing bead and each forms an integral part of that profiled bead; it is not possible to separate an exterior covering from the profiled body that carries it without damaging the integrity of the profiled bead.

As the material of the profiled bodies is different from that of the exterior covering(s), the profiled bodies may therefore be manufactured by co-extrusion of a plurality of materials, at the same time as the exterior covering(s), which is particularly practical.

In the glazing, each of the two profiled bodies is in contact, preferably without adhesion, against a part of the edge surface of a window. Each of the two profiled bodies is preferably at a distance from the other body (i.e. without direct contact therewith) so that it is the exterior covering, or the two exterior coverings, that actually form(s) the join, thanks to their flexibility, and not the profiled bodies, which are harder and constitute an effective and reliable support for the exterior covering(s).

Each profiled body is situated facing and in contact with only one part of the edge surface of the adjacent window in the direction of the thickness of that adjacent window (that is to say the height of its edge surface) and it is situated facing one part or the totality of said edge surface of the adjacent window in the direction of the length of that edge surface.

The exterior covering (or the two exterior covering) is (or are) situated facing only a part of the edge surface of the adjacent window in the direction of the thickness of that adjacent window (that is to say the height of that edge surface) because the profiled body that is situated underneath, toward the interior, also faces this adjacent edge surface; it is (they are) situated facing a part or the totality of the edge surface of the adjacent window in the direction of the length of that edge surface.

The exterior covering, or the two exterior coverings when there are two of them, rests (on said profiled body) (or respectively bodies); this (or these) profiled body (or bodies) constitute(s) a rigid support for this (or these) flexible exterior covering(s).

When there is only one of them, this exterior covering is preferably in contact with the edge surface of the window to which is fixed the profiled body that carries this exterior covering and in contact with the edge surface of the contiguous window in order for this double contact to participate in reducing the penetration of dust or fluid farther toward the interior and confers an esthetic appearance of continuity. This double contact is a contact without adhesion. The exterior covering is preferably under internal compression.

When two exterior coverings are present, each is preferably in contact with the edge surface of the window to which is fixed the profiled body that carries this exterior covering without being in contact with the edge surface of the contiguous window since it is the other exterior covering, carried by the other profiled body, that is in contact with this edge surface of the contiguous window. This double contact (exterior covering-edge surface) participates in reducing the penetration of dust or fluid farther toward the interior and confers an esthetic appearance of contiguity. This double contact is a contact without adhesion. Each exterior covering is preferably under internal compression at the level of the contact (exterior covering-edge surface).

Surprisingly, it has been discovered in this way that it is possible to produce a join between two windows with two profiled bodies and one (or two) exterior covering(s). This solution is simpler to manufacture and more effective than the prior art solutions, in particular when the distance between the two contiguous windows is small.

Independently of this, it has been discovered that it is possible to arrive at similar results by providing glazing similar to that of the invention except in that it includes:
on the one hand a single profiled body situated facing a part, or even the totality, of the edge surface of said windows, without contact with those edge surfaces,
on the other hand, two curved exterior coverings each of which includes a portion situated farther toward the exterior than said profiled body and a portion against only a part of the respective edge surface of said windows and has an exterior face that is situated in continuity with said exterior face of said window, and said exterior coverings being flexible, with a Shore A hardness between 45 and 90 inclusive, or even between 55 and 85 inclusive.

The glazing according to the invention preferably has a width between said edge surfaces of the windows that is between 2.0 and 20.0 mm inclusive, or even between 3.0 and 15.0 mm inclusive, or even between 4.0 and 10.0 mm inclusive. This makes possible a particularly compact join between the windows.

In an independent variant, one, or the two, profiled body (or bodies) has (or have) a Shore D hardness between 1 and 100 inclusive, or even between 5 and 95 inclusive; this makes possible better mechanical strength. Moreover, and again preferably, the widths of the two profiled bodies are identical.

In a variant independent of the preceding one, one, or the two, profiled body (or bodies) include(s), seen in cross section, an interlayer wing and the window is laminated, said interlayer wing being situated between an interlayer face of said exterior layer of glass and an interlayer face of said interior layer of glass.

Said interlayer wing is in direct or indirect contact (in the latter case via an adhesive material) with said interlayer face of said exterior layer of glass and is in direct or indirect contact (in the latter case via an adhesive material) with said interlayer face of said interior layer of glass.

In the context of this variant, said interlayer wing preferably has a thickness:
equal to the thickness between said exterior layer of glass and said interior layer of glass (of the window that carries the profiled bead) and in particular equal to the thickness of said plastic material interlayer (of that window) and in particular equal to 0.76 mm, or
less than the thickness between said exterior layer of glass and said interior layer of glass (of that window).

Said interlayer wing is preferably retained between the interlayer face of the exterior layer of glass and the interlayer face of the interior layer of glass mechanically, for example by being compressed between these two faces, and/or chemically, for example by being stuck to these two faces. Although this is not shown, it is moreover possible for the interlayer wing to be embedded (mechanical and chemical retention) in the plastic material interlayer, with the material of that plastic material interlayer on the one hand between the interlayer wing and the interlayer face of the exterior layer of glass and/or on the other hand between the interlayer wing and the interlayer face of the interior layer of glass.

In another variant independent of the preceding ones, one, or the two, profiled body (or bodies) include(s), seen in cross section, an interior wing situated under said interior face of said window.

In the context of this variant, said interior wing preferably includes a boss with the point of the boss oriented toward the interior in order to bear on the rabbet, said boss preferably having a Shore A hardness between 45 and 95 inclusive, or even between 55 and 85 inclusive.

When a profiled body includes, seen in cross section, an interlayer wing then the window to which it is fixed is necessarily laminated; when a profiled body includes, seen in cross section, an interior wing then the window to which it is fixed is not necessarily laminated; it may be monolithic or laminated.

In a variant independent of the preceding ones, one, or the two, exterior covering(s) include(s) an interior tongue situated between the two profiled bodies and preferably in one piece with said exterior covering.

In a variant independent of the preceding ones, one of said profiled bodies includes a lateral tongue to support the exterior covering of the contiguous window; only one profiled body includes a lateral tongue.

In a variant independent of the preceding ones, said two profiled bodies are each fixed to only one of said windows.

In a variant alternative to the preceding one, said two profiled bodies are both fixed to only one window and said glazing preferably includes a single exterior covering that has an exterior face that is situated in continuity with said exterior faces of said windows.

The present invention relates farther to a window according to claim 13 for glazing according to the invention; that window includes on the one hand at least one profiled body situated in contact against a part of its edge surface and on the other hand one or two exterior covering(s) that is (or are) situated (or each situated) farther toward the exterior than said profiled body and an exterior covering of which is situated against a part of its edge surface and has an exterior face that is situated in continuity with its exterior face, said exterior covering(s) being flexible, with a Shore A hardness between 45 and 90 inclusive, or even between 55 and 85 inclusive.

In a very particular variant, this window includes two profiled bodies only one of which is in contact against a part of its edge surface and preferably a single exterior covering that has an exterior face that is situated in continuity with its exterior face.

The present invention advantageously makes it possible to propose an assembly of two windows that is reliable, compact and simple to implement.

It is therefore possible to produce glazing including two windows such that the exterior faces of the two windows are in continuity with one another, this continuity being produced by the exterior covering or coverings between the edge surfaces of the windows, although that continuity can be interrupted by a slot.

In the glazing according to the invention, the two contiguous windows are not fixed (in the sense of directly attached or stuck) to one another: each is fixed (stuck) to a single element (that is to say to the same element) of the window opening that together they close, that is to say a body element (such as for example a rabbet) in the case of application of the glazing as vehicle glazing.

In the present document, when ranges of values are indicated, the limits are included in the ranges.

BRIEF DESCRIPTION OF THE DRAWINGS

A plurality of embodiments are described hereinafter by way of nonlimiting example with reference to the appended figures.

DETAILED DESCRIPTION

Figure 1:
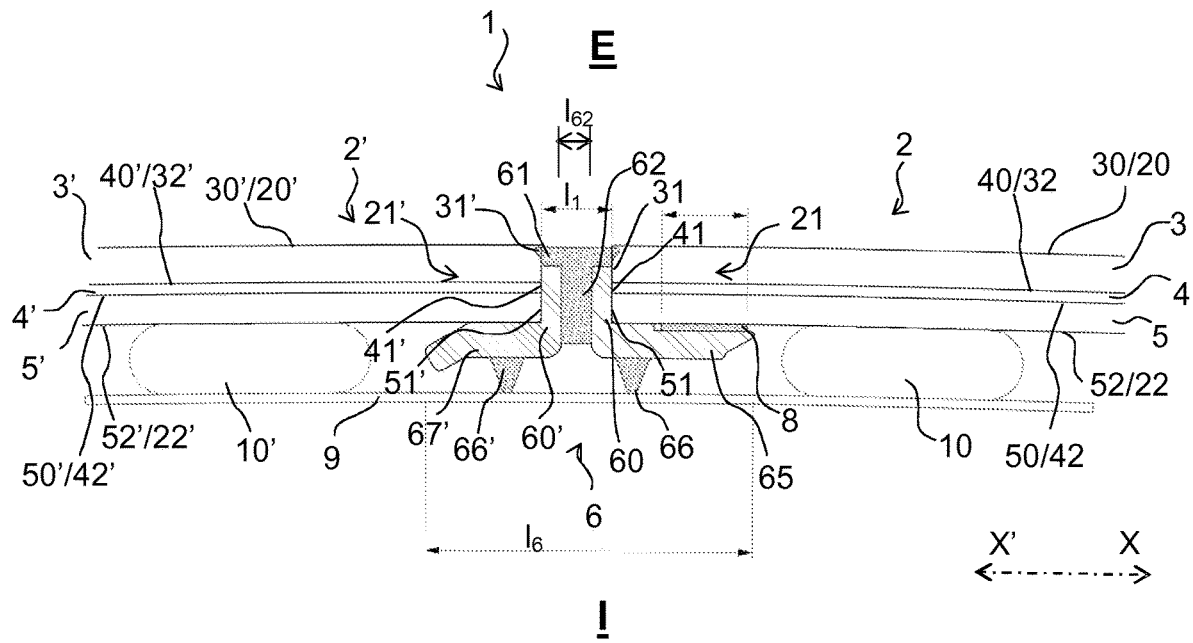
FIG. 1 is a sectional view of the assembly in accordance with a first embodiment of the invention of two windows on a body rabbet with the aid of a profiled bead with two profiled bodies with an interior wing and a single exterior covering.

In each figure, in order to make them easier to read, the proportions between the various elements are respected and the elements in the background are generally not represented. The same references designate the same elements from one figure to another.

Glazing 1, 100 is visible in part in FIGS. 1, 3 to 6, comprising at least two contiguous windows 2, 2' each of which is monolithic or laminated.

The present invention is described by way of example in the context of an application as vehicle glazing; this glazing closes a window opening by providing a separation between an exterior space E that is outside the vehicle and an interior space I that is inside the vehicle. The "exterior" and "interior" concepts are therefore considered relative to this exterior space E and this interior space I, respectively.

Each window 2, 2' therefore has an exterior face 20, 20' oriented toward the exterior space E, an interior face 22, 22' oriented toward the interior space I and a peripheral edge surface 21, 21' situated between those two faces.

The present invention is described in particular in application to fixed vehicle roof glazing and the figures are therefore sectional views in a vertical plane of the glazing 1, 100 installed, stuck, in a body window opening.

The application to vehicle roof glazing is described with reference to FIGS. 1, 3 to 6, that glazing 1, 100 including two windows side by side or to be even more precise one in front of the other in the direction of forward movement of the vehicle.

Figure 3:
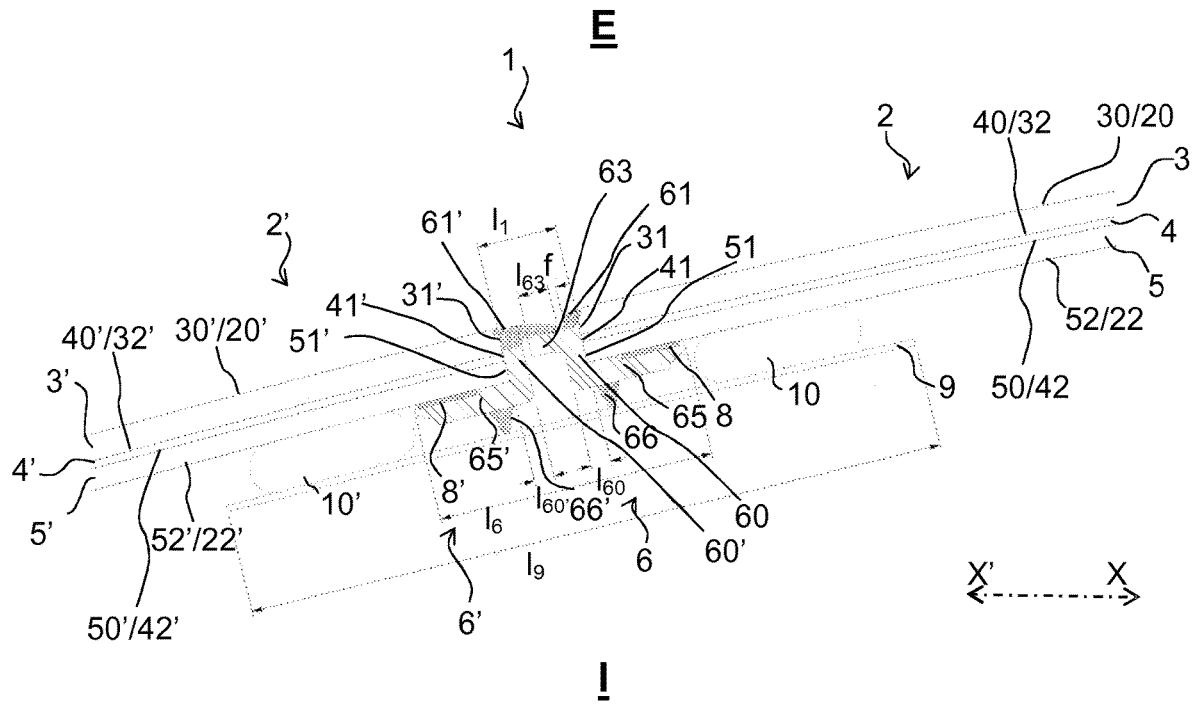
FIG. 3 is a sectional view of the assembly in accordance with a second embodiment of the invention of two windows on a body rabbet with the aid of two profiled beads each including a profiled body with an interior wing and an exterior covering, a profiled body including a lateral tongue for supporting the exterior covering of the profiled bead of the other window.

In the context of the present document, the "centripetal" concept and the "centrifugal" concept are to be considered relative to the central longitudinal axis of forward movement of the vehicle equipped with the glazing according to the invention as roof glazing, that is to say the axis generally referred to as the axis X-X' of the vehicle, as can be seen only in FIGS. 1 and 3, although the orientation is the same in the other figures; the centripetal direction is the direction X on this axis whereas the centrifugal direction is the opposite direction X'.

The glazing 1, 100 is intended to close a window opening that here is formed in a body of the vehicle; an edge of this window opening—in this instance a central transverse edge, is shown by a rabbet 9.

Each of the two windows 2, 2' of the glazing 1, 10 may be a monolithic window constituted of a single layer of glass.

Each of the two windows 2, 2' of the glazing 1, 100 is preferably a laminated window that includes from the exterior toward the interior at least: an exterior layer of glass 3, 3', a plastic material interlayer 4, 4' and an interior layer of glass 5, 5'; however, it is possible for at least one other layer to be interleaved between the exterior layer of glass 3, 3' and the plastic material interlayer 4, 4' or between the plastic material interlayer 4, 4' and the interior layer of glass 5, 5'.

In the figures, each layer of glass is shown with a rounded edge surface; however, these edge surfaces may be straight, with intersections between the edge surfaces and the faces which are then at right angles.

Each exterior layer of glass 3, 3' has an exterior face 30, 30' that is oriented toward the exterior E and therefore corresponds to the exterior face 20, 20' of the window 2, 2', an interlayer face 32, 32' that is oriented toward the plastic material interlayer 4, 4', and an edge surface 31, 31' situated between those two faces.

Each interior layer of glass 5, 5' has an interlayer face 50, 50' that is oriented toward the plastic material interlayer 4, 4', an interior face 52, 52' that is oriented toward the interior I and therefore corresponds to the interior face 22, 22' of the window 2, 2', and an edge surface 51, 51' situated between those two faces.

Each plastic material interlayer 4, 4' has an exterior interlayer face 40, 40' that is oriented toward the interlayer face 32, 32' and here is in contact with that interlayer face 32, 32', an interior interlayer face 42, 42' that is oriented toward the interlayer face 50, 50' and here is in contact with that interlayer face 50, 50', and an edge surface 41, 41' that is situated between those two interlayer faces 40, 42 and 40', 42'.

Each window 2, 2' therefore has an exterior face consisting of the exterior face 30, 30' of the exterior layer of glass 3, 3', an interior face consisting of the interior face 52, 52' of the interior layer of glass 5, 5' and an edge surface situated between those two faces, corresponding to the edge surface 31, 31' of the exterior layer of glass 3, 3' and to the edge surface 51, 51' of the interior layer of glass 5, 5', these two edge surfaces (on the one hand 31, 51 and on the other hand 31', 51') here being in continuity with one another and being separated by a space corresponding to the thickness of the layer of plastic material 4, 4'.

Each window 2, 2' is intended to be stuck to the rabbet 9 with the aid of a bead of glue 10, 10' that is shown diagrammatically and is situated between the interior face 22, 22' and an adjacent part of the rabbet 9, that is to say between the interior face 52, 52' of the interior layer of glass and an adjacent part of the rabbet 9.

It is possible for the adjacent window 2' to be a monolithic window and the adjacent window 2 to be laminated, or vice versa.

The adjacent window 2' preferably has a thickness identical to the window 2 in order to facilitate positioning of the one relative to the other during the assembly and the manufacture of the glazing 1.

However, the invention may be particularly practical if the two windows 2, 2' are not of the same thickness, precisely to make it possible to level up one thickness relative to the other one.

The exterior face 20' of the adjacent window 2' is preferably situated substantially in continuity with or in line with the exterior face 20 of the window 2.

The interior face 22' of the adjacent window 2' is also preferably situated substantially in line with the interior face 22 of the adjacent window 2 but if this is not the case the rabbet 9 or an additional shim can compensate any difference.

In FIGS. 1, 3 to 6, the rabbet 9 constitutes a crossmember of the body, extending from a lefthand to a righthand side of the body of the vehicle. It constitutes a rigid support for the edges of the window 2 and of the adjacent window 2'. It has a width $l_9$ of the order of 5.0 to 12.0 cm.

The assembly of the two windows 2, 2' to form the glazing 1 is described hereinafter with reference to FIGS. 1 to 5.

When the join between the two windows is observed in cross section, the glazing includes:
  on the one hand two profiled bodies 60, 60' that are separate/distinct from one another and are situated facing one another, each profiled body 60, 60' being in contact against only a part of the respective edge surface 21, 21' of a window 2, 2' whilst being at a distance from the other profiled body, 60', 60, respectively, that is to say with no direct contact with the other profiled body;
  on the other hand, one or two exterior covering(s) 61, 61' that is (or are) each situated farther toward the exterior than said profiled bodies 60, 60 and against only a part of the edge surface 21, 21' of the window 2, 2'; this (or these) exterior covering(s) each has (or have) an exterior face that is situated in continuity with the exterior face 20, 20' of the window 2, 2' against which it is (or they are) situated;
  furthermore with said exterior covering(s) 61, 61' that is (or are) flexible, with a Shore A hardness between 45 and 90 inclusive, or even between 55 and 85 inclusive.

The present solution is indicated in particular when the glazing 1 has a width $l_1$ between edge surfaces 21, 21' that is relatively small, that is to say between 2.0 and 20.0 mm inclusive, or even between 3.0 and 15.0 mm inclusive, or even between 4.0 and 10.0 mm inclusive. This width $l_1$ is for example 4.5 mm in FIGS. 1 and 5, approximately 8 mm in FIG. 3 and approximately 7 mm in FIG. 4.

Actually, the proposed assembly is particularly reliable when the width between the edge surfaces of the windows is small.

The "profiled bead" concept is used hereinafter to describe the various embodiments and the various variants of the invention. This concept applies in what might be termed a very general manner to a window "join": a window join is a bead of plastic material that is fixed, or attached, to a peripheral edge of a window after manufacturing the window and before assembling the two windows in a contiguous manner to form glazing.

Figure 2:
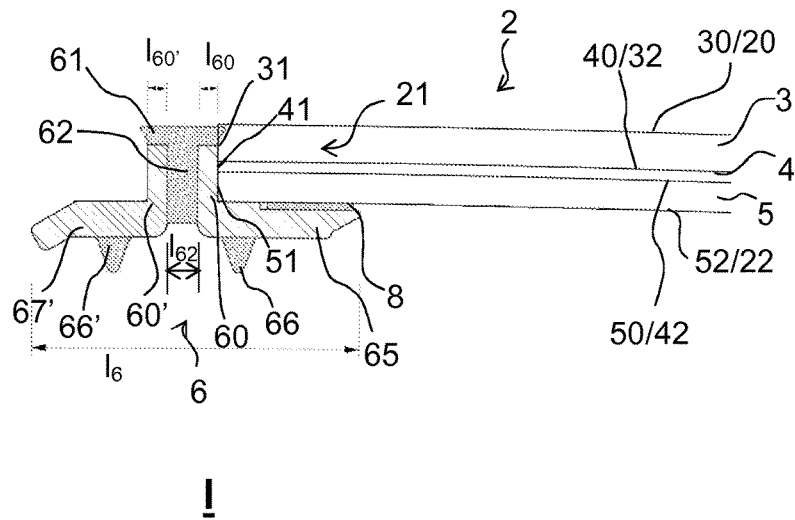
FIG. 2 is a sectional view of the righthand window from FIG. 1 with the profiled bead with two profiled bodies and a single exterior covering fixed to this window.
Figure 4:
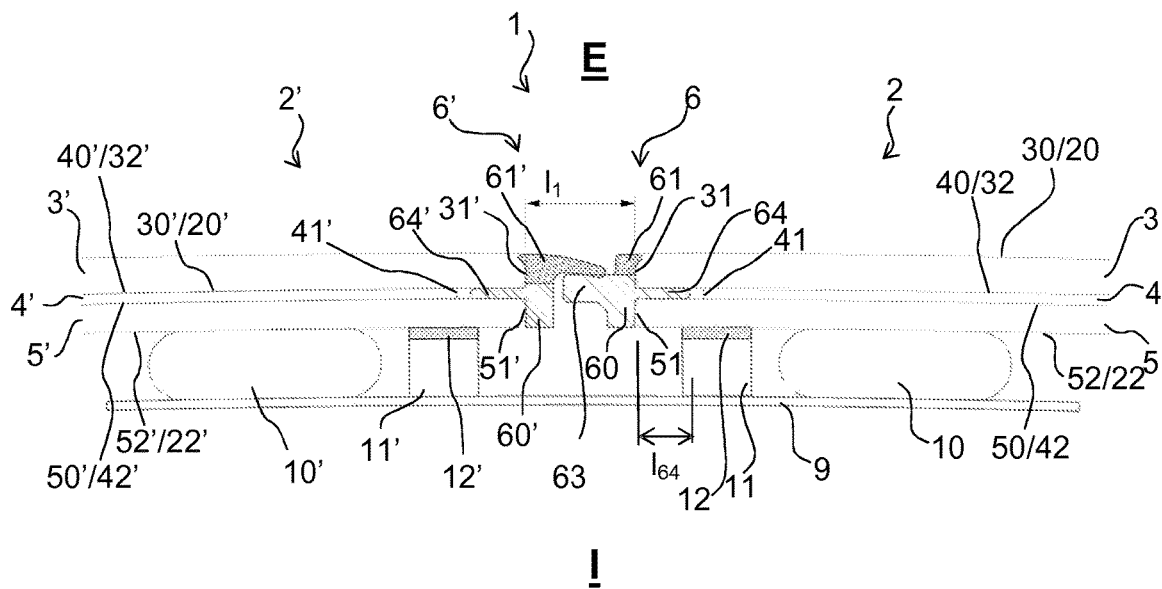
FIG. 4 is a sectional view of a variant of FIG. 3 that differs in that the two profiled beads each include a profiled body with an interlayer wing.
Figures 5, 6:
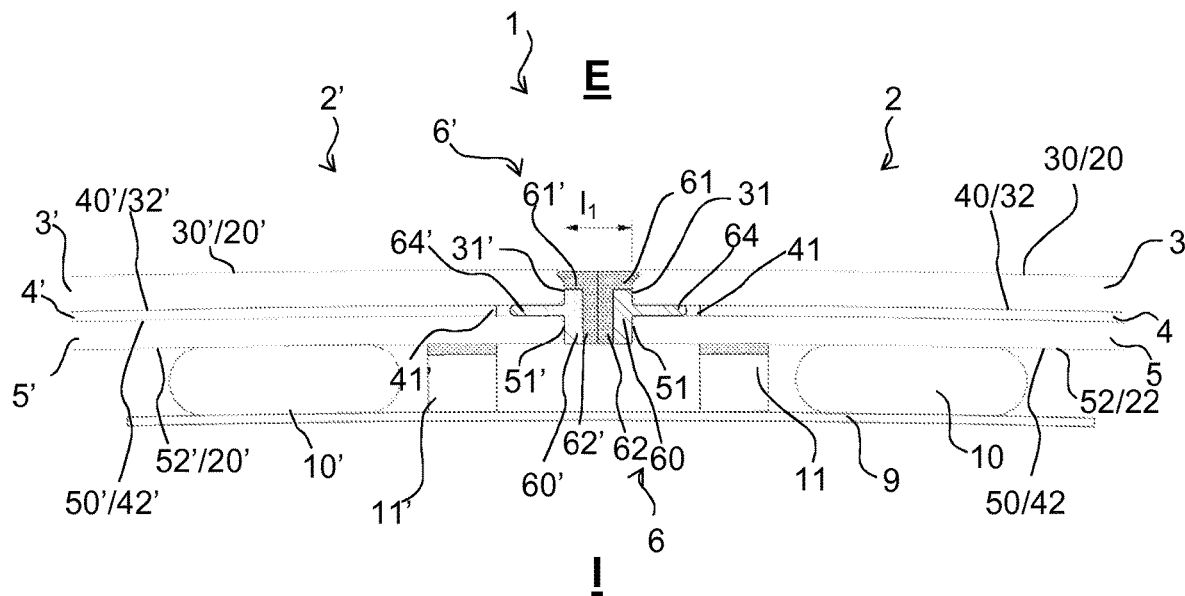
FIG. 5 is a sectional view of a variant of the embodiment from FIG. 1 that differs in that each window includes a profiled bead including a profiled body with an interlayer wing and an exterior covering.
FIG. 6 is a sectional view of one embodiment of an assembly of two windows on a body rabbet, with the aid of a single profiled bead including a single profiled body, an interior wing and two curved exterior coverings.

For its attachment to a window, a profiled bead 6, 6' includes, seen in cross section:
  an interior wing 65, 65' that is situated under an edge of the interior face 22, 22' of the window 2, 2', and here to be more precise under an edge of the interior face 52, 52' of the interior layer of glass 5, 5', as can be seen in FIGS. 1 to 3, and/or
  when the window 2, 2' is a laminated window, an interlayer wing 64, 64' that is situated between the interlayer face 32, 32' of the exterior layer of glass 3, 3' and the interlayer face 50, 50' of said interior layer of glass 5, 5', as can be seen in FIGS. 4 and 5.

These two attachment modes are described hereinafter. Each features a variant of the invention.

Profiled Bead with Interior Wing

The profiled bead 6, 6' includes, seen in cross section, an interior wing 65, 65' situated under (directly under or indirectly under with an interposed/inserted layer of glue or adhesive tape) the interior face 22, 22' of the window 2, 2' to which it is attached; the interior wing 65, 65' is therefore farther toward the interior than this interior face 22, 22'.

An adhesion strip 8, 8' formed by a layer of glue or a double-sided adhesive tape is situated between a centripetal part of the interior wing 65, 65' and the interior face 22, 22'.

This adhesion strip enables this interior wing 65, 65' to be fixed to the underlying interior face 22, 22'.

Profiled Bead with Interlayer Wing

The interlayer wing 64, 64' is preferably in contact on the one hand with the interlayer face 32, 32' of the exterior layer of glass 3, 3' and on the other hand with the interlayer face 50, 50' of the interior layer of glass 5, 5' and lies between those two faces.

Along the edge of the window including the profiled bead 6, 6' with the interlayer wing the edge surface 41, 41' of the plastic material interlayer 4, 4' is therefore set back centripetally relative to the respective edge surfaces 31, 31'/51, 51' of the exterior layer of glass and of the interior layer of glass to enable the presence of the interlayer wing.

In FIGS. 4 and 5 the interlayer wing 64, 64' is a single wing made from the same material and in one piece with the profiled body 60, 60' with no internal reinforcement.

As can be seen in FIGS. 4 and 5, the totality of an exterior face of the interlayer wing 64, 64' is in contact with the interlayer face 32, 32' of said exterior layer of glass 3, 3' and the totality of an interior face of the interlayer wing 64, 64' is in contact with the interlayer face 50, 50' of the interior layer of glass 5, 5'.

The interior wing 64, 64' therefore occupies the space starting from vertically below the edge surface 31, 31' of the exterior layer of glass and vertically above the edge surface 52, 52' of the interior layer of glass and in the direction of the plastic material interlayer 4, 4'; the interior wing therefore has a thickness identical to the thickness of the plastic material interlayer 4, 4' (here in this instance a thickness of 0.76 mm). However, it does not come into contact with the plastic material interlayer 4, 4' in order not to interfere with the cohesion produced by this plastic material interlayer 4, 4' with the two layers of glass, that is to say in order not to interfere with the lamination.

The interlayer wing 64, 64' has a width $l_{64}$, shown in FIG. 4, between 2.0 and 6.0 mm inclusive, or even between 3.0 and 5.0 mm inclusive and here of precisely 3.5 mm (this is the same value as for the FIG. 5 example). This width is sufficient to enable good retention of the interlayer wing between the exterior layer of glass and the interior layer of glass with no risk of interfering with the cohesion of the plastic material interlayer 4, 4' with the two layers of glass.

In FIGS. 4 and 5, the interlayer wing 64, 64' does not come into contact with the plastic material interlayer 4, 4'. It is retained between the interlayer face 32 and the interlayer face 50 by being compressed (mechanical retention) between those two faces, as shown here; it could be stuck (chemical retention) to these two faces. Although this is not shown, it is moreover possible for the interlayer wing 64, 64' to be embedded in the plastic material interlayer 4, 4', with the material of that plastic material interlayer 4, 4' on the one hand between the interlayer wing 64, 64' and the interlayer face 32 and/or on the other hand between the interlayer wing 64, 64' and the interlayer face 50.

It is possible to produce an interlayer wing with a thickness less than the thickness between the exterior layer of glass and said interior layer of glass of the window.

The window 2, 2' rests on the rabbet 9 thanks to an abutment 11, 11' (or a plurality of abutments distributed along the edge) disposed between the interior face 22, 22' and the face of the rabbet oriented toward the exterior. This abutment (these abutments) can make it possible to prevent contact between the interior face 22, 22' and the rabbet in order to make it possible to protect the window 2, 2' and for example to have a flexible exterior face 12, 12'; it (they) can moreover make it possible to control the thickness of the bead of glue 10, 10'.

When the profiled bead 6 includes both an interlayer wing and an interior wing, to be able to hold the interior wing 65 away from the interior face 52 during the introduction of the interlayer wing 64 into the space between the two layers of glass, the interior wing 65 includes a hinge portion (not shown) made of a flexible polymer material.

This hinge portion makes it possible to lift the interior wing 65 to position the adhesion strip 8 (in the case of a layer of glue) or to activate the adhesion strip (in the case of a double-sided adhesive tape with a temporary protection film that can be peeled off) and to make it possible to fix the interior wing 65 to the underlying interior face 52.

Although the attachment modes are described above such that in FIGS. 3 to 5 the same applies to both windows 2, 2' of the glazing 1, it is entirely possible for the glazing to employ a mode of attaching a profiled bead to a window that is different from the mode of attachment of another profiled bead to the other window.

In the figures the profiled body 60, 60' is a lateral body: the profiled body 60, 60' of the profiled bead 6, 6' extends along one part of the edge surface of the window 2, 2'.

The profiled body 60, 60' is a lateral body because it does not extend beyond an imaginary plane in continuity with the exterior face 20, 20' of the window 2, 2' to which it is attached or an imaginary plane in continuity with the interior face 22, 22' of the window 2, 2' to which it is attached.

In glazing according to the invention, the width $l_{60}$ of the profiled body 60 is preferably identical to the width $l_{60'}$ of the profiled body 60' in order to facilitate referencing.

Each of the profiled bodies 60, 60' has a width $l_{60}$, $l_{60'}$ that is for example approximately 1.2 mm in FIG. 1, approximately 1.8 mm in FIG. 3, approximately 1.5 mm in FIG. 4 and approximately 1.4 mm in FIG. 5.

The exterior face 20, 20' of the window 2, 2' is therefore free relative to the profiled bead: the profiled bead does not include an exterior wing; the interior face 22, 22' is only free in the variant with the interlayer wing and is not free in the variant with the interior wing because of the presence of that interior wing.

In the variants shown in FIGS. 1 to 5, the profiled body 60, 60' is situated, from the point of view of the interior/exterior orientation, facing the totality of the height of the edge surface 51, 51' of said interior layer of glass 5, 5' and the edge surface 41, 41' of the plastic material interlayer 4, 4' and facing only one part of the height of the edge surface 31, 31' of said exterior layer of glass 3, 3'.

Whatever the embodiment, the constituent material of the profiled body 60 may be reinforced by the interior presence of an insert 68, such as a metal insert, for example, which makes it possible to increase the stiffness of the profiled body. This insert may for example be an aluminum profiled element 0.4 mm thick.

This insert may extend inside a wing, that is to say inside the interlayer wing 64, 64' or inside the interior wing 65, 65'.

The interlayer wing 64, 64' has a width $l_{64}$ of approximately 4.0 mm and the interior wing 65, 65' has a width of approximately 12.0 mm; the adhesion strip 8, 8' has a width of approximately 6.0 mm.

In FIGS. 1 to 3, the profiled bead 6, 6' has a height equal to the thickness of the window 2, 2' plus the thickness of the interior wing 65, 65', 67' and the boss 66, 66'.

In FIGS. 4 and 5, the profiled bead 6, 6' has a height identical to the thickness of the window 2, 2'.

The profiled body 60, 60' is preferably in one piece with the interlayer wing 64, 64' and/or with the interior wing 65, 65'; this is why they are shown with the same cross-hatching in the figures. They are preferably made of a relatively rigid material, such as a thermoplastic polymer of the polypropylene type, for example. The, or the two, profiled body (or bodies) 60, 60' preferably has or have a Shore D hardness between 1 and 100 inclusive, or even between 5 and 95 inclusive, in order to constitute a sufficiently hard support for the exterior covering(s) 61, 61'.

The exterior covering 61, 61' is flexible. It is situated facing and in contact with at least one part of the edge surface 21, 21' of the window 2, 2' to which the profiled bead 6, 6' is fixed.

It has a Shore A hardness between 45 and 95 inclusive, or even between 55 and 85 inclusive; it is this low hardness that confers on it its flexibility. It may for example be made of a thermoplastic elastomer (TPE), of the TPE-U type based on polyurethane or of the TPE-S type based on styrene.

The contact of the exterior covering 61, 61' with the edge surface 21, 21' is merely contact, with no adhesion. The profile body 60, 60' therefore forms a rigid support for the exterior covering 61, 61'.

As can be seen in the figures, the exterior face 20, 20' of each window 2, 2' is free relative to the profiled bead 6, 6'; each exterior covering 61, 61' has an exterior face that is situated in continuity with the exterior face 20, 20' of the window 2, 2' against which it is situated. Each exterior covering 61, 61' is therefore flush with and in continuity with the exterior face 20, 20' of the window 2, 2'; it is "flush". Each exterior covering 61, 61' does not extend farther toward the exterior than the exterior face 20, 20' of the window 2, 2'.

FIG. 1 shows a particular variant in which the glazing 1 includes a single profiled bead 6 fixed to the window 2.

This profiled bead 6 includes two profiled bodies 60, 60' of which only one is in contact against only a part of the edge surface 21 of the window 2 to which that profiled bead is fixed.

That profiled bead 6 moreover includes a single exterior covering 61 that has an exterior face that is situated in continuity with the exterior face 20 of the window 2 to which it is fixed.

This exterior covering 61 includes an interior tongue 62 that is situated between the two profiled bodies 60, 60'; this tongue is in one piece with the exterior covering 61. This interior tongue 62 provides a buffer between the two profiled bodies 60, 60'. Here it has a width $l_{62}$ of approximately 2.1 mm.

FIG. 2 shows the window 2 from FIG. 1 before its assembly with the contiguous window 2'. It shows that the profiled bead 6 is fixed only to the window 2, thanks to the adhesion strip 8; it is not fixed to the adjacent window 2'.

Comparison of FIG. 2 with FIG. 1 shows that in the glazing 1 from that FIG. 1 the profiled bead is fixed to the window 2 thanks only to the adhesion strip 8, that this window 2 is fixed to the rabbet 9 thanks only to the bead of glue 10, and that the contiguous window 2' is fixed to that rabbet 9 thanks only to the bead of glue 10' whilst resting on the interior wing 65', against the profiled body 60' and against the exterior covering 61. The three contacts of the contiguous window 2' with the interior wing 65', the profiled body 60' and the exterior covering 61 are contacts without adhesion.

The profiled body 60' and an interior wing 67' that extends under the interior face 22' of the contiguous window 2' are both part of the profiled bead 6; they do not adhere to the contiguous window 2'.

This profiled bead 6 has a total width $l_6$ of approximately 21 mm.

FIGS. 3 to 5 show other particular variants in each of which the glazing 1 includes two profiled beads 6, 6', each respectively attached to the window 2, 2' and only to the window 2, 2', respectively (that is to say without being attached to the other window 2', 2), respectively. Accordingly, said two profiled bodies 60, 60' of the profiled beads 6, 6' are each fixed to the windows 2, 2', respectively.

Moreover, in these variants from FIGS. 3 to 5, each profiled bead 6, 6' includes an exterior covering 61, 61' situated farther toward the exterior than the profiled body 60, 60' and resting on that profiled body 60, 60'.

FIGS. 3 and 4 show a particular variant in which only one profiled body 60, that of the righthand glazing in the figures, includes a lateral tongue 63 extending laterally and centrifugally in the direction of the other profiled body 60' but without reaching that other profiled body 60'.

Moreover, the exterior covering 61' of the profiled bead 6' of the contiguous window 2' has an appendix that extends laterally and centripetally in the direction of the exterior covering 61 of the profiled bead 6 of the window 2 but without reaching that exterior covering 61.

Accordingly, not only does the profiled body 60 of the profiled bead 6 provide a support for the exterior covering 61 of that profiled body 6 but the profiled body 60 also provides a support for the exterior covering 61' of the profiled bead 6' of the contiguous window 2'.

The exterior covering 61' of the profiled bead 6' can be in contact with the exterior covering 61 of the profiled bead 6 or close to it without contact, with a thin slot f between 0.5 and 5.0 mm wide, for example, between the two exterior coverings 61, 61'.

The lateral tongue 63 participates in the positioning and the referencing of the contiguous window 2' relative to the window 2 during the manufacture of the glazing 1.

The lateral tongue 63 has a width $l_{63}$ that is for example approximately 4 mm in FIG. 3.

In FIG. 5 the two exterior coverings 61, 61' each include an interior tongue 62, 62' and these two interior tongues 62, 62' are situated between the two profiled bodies 60, 60', preferably being in one piece with said exterior covering 61, 61'. These two interior tongues 62, 62' together produce a buffer between the two profiled bodies 60, 60'.

FIG. 6 shows glazing 100 producing the assembly of two windows 2, 2' that is similar to the previous glazing except that it includes a profiled bead 6 that incorporates:

on the one hand a single profiled body 60 situated facing a part, or even the totality of the edge surface 21, 21' of said windows 2, 2', without contact with those edge surfaces 21, 21', on the other hand, two curved exterior coverings 61, 61' each of which includes:

one portion situated farther toward the exterior than said profiled body 60, and one portion (joined to the preceding one and extending toward the interior) against only a part of the respective edge surface 21, 21' of said windows 2, 2', and which each have an exterior face that is situated in continuity with said exterior face 20, 20' of said window 2, 2'.

As in the previous glazing, in the glazing 100 said exterior coverings 61, 61' are flexible, with a Shore A hardness between 45 and 90 inclusive, or even between 55 and 85 inclusive.

The two exterior coverings 61, 61' and the profiled body 60 are part of the profiled bead 6 and each forms an integral part of the profiled bead 6; it is not possible to separate an element of this assembly and to preserve the integrity of the profiled bead. The profiled bead is therefore easy to install in a single operation.

As the material of the profiled body 60 is different from that of the exterior coverings 61, 61', the profiled bead 6 can therefore be manufactured by co-extrusion of a plurality of materials, which is particularly practical.

Here the two exterior coverings 61, 61' have a curvature that is both facing an intersection between an exterior face 20, 20' and facing an edge surface 21, 21' of a window 2, 2'. These exterior coverings 61, 61' are carried by the profiled body 60.

The present solution is particularly indicated when the glazing 100 has a width $l_1$ between said edge surfaces 21, 21' that is relatively small, that is to say between 2.0 and 20.0 mm inclusive, or even between 3.0 and 15.0 mm inclusive, or even between 4.0 and 10.0 mm inclusive. This width $l_1$ is for example 4.5 mm in FIG. 6.

The profiled body 60 of the glazing 10 preferably has a head 69 that provides a support for the two exterior coverings; a centripetal exterior covering 61 is in contact with the edge surface 21 of the window 2 to which is fixed the profiled body 60 that carries this exterior covering 61 without being in contact with the edge surface of the contiguous window 2' because it is the other, centrifugal exterior covering 61' that is in contact with that edge surface 21' of the contiguous window 2'. This double contact (exterior covering-edge surface) participates in reducing the penetration of dust or fluid farther toward the interior and confers an esthetic appearance of continuity. This double contact is a contact without adhesion. Each exterior covering is preferably under internal compression at the level of the contact (exterior covering-edge surface); this is what is illustrated by the fact that the exterior coverings 61, 61' "project" over the exterior layers of glass 4.

The exterior coverings 61, 61' are situated between the exterior faces of the windows 2, 2' in order to produce a surface continuity but this continuity can nevertheless be interrupted by a very fine slot f with a width between 0.2 and 0.5 mm inclusive, for example, between the two exterior coverings 61, 61'.

In FIG. 6, the profiled bead 6 is fixed only to the window 2, thanks to the adhesion strip 8 situated between the interior face 22 and the interior wing 65; it is not fixed to the adjacent window 2'.

The single profiled body 60 of the profiled bead 6 of the glazing 10 preferably has a plane of symmetry P and the assembly formed by the profiled body 60 and the two exterior coverings 61, 61' more preferably has a plane of symmetry P in order to enable uniform distribution of stresses.

This solution of a profiled bead 6 that incorporates a single profiled body 60 and a double exterior covering 61, 61' may include, instead of or in addition to the interior wing 65, an interlayer wing 64, such as the one that can be seen in FIGS. 4 and 5.

Although this is not shown, it is possible for the window 2 of the glazing 1, 100 to include a masking strip situated farther toward the exterior than the interlayer wing and/or farther toward the exterior than the interior wing in order to mask both the interlayer wing and/or the interior wing as well as the bead of glue 10 fixing the window 2 to the body.

The adjacent window 2' may also include a masking strip (not shown) for masking the bead of glue 10' fixing the adjacent window 2' to the body.

The present invention may be applied to any glazing and in particular to any vehicle glazing. It may be applied to any facing edges of two windows of that glazing: lefthand, righthand, top or bottom.

The invention claimed is:

1. A glazing, comprising:
two contiguous windows, with at least one of the two contiguous windows being a laminated window comprising an exterior layer of glass, an interior layer of glass and a plastic material interlayer situated between said interior and exterior layers of glass, each window of the two contiguous windows having an exterior face, an edge surface and an interior face,
two profiled bodies situated face to face and each situated in contact against a part of the edge surface of one window of said two contiguous windows, and
at least one exterior covering that is situated farther toward the exterior than said profiled bodies and against a part of the edge surface of said two contiguous windows and that has an exterior face that is situated in continuity with said exterior face of said window,
said exterior covering being flexible, with a Shore A hardness between 45 and 90 inclusive.

2. The glazing as claimed in claim 1, wherein the glazing has a width between said edge surfaces between 2.0 and 20.0 mm inclusive.

3. The glazing as claimed in claim 2, wherein the width between said edge surfaces is between 4.0 and 10.0 mm inclusive.

4. The glazing as claimed in claim 1, wherein one of the profiled bodies has a Shore D hardness between 1 and 100 inclusive and wherein widths of the two profiled bodies are identical.

5. The glazing as claimed in claim 1, wherein one of the bodies includes, seen in cross section, an interlayer wing situated between an interlayer face of said exterior layer of glass and an interlayer face of said interior layer of glass.

6. The glazing as claimed in claim 5, wherein said interlayer wing has a first thickness:
equal to a second thickness between said exterior layer of glass and said interior layer of glass, or
less than the second thickness between said exterior layer of glass and said interior layer of glass.

7. The glazing as claimed in claim 6, wherein said first thickness equal to a thickness of said plastic material interlayer.

8. The glazing as claimed in claim 1, wherein one of the bodies includes, seen in cross section, an interior wing situated under said interior face of said window.

9. The glazing as claimed in claim 8, wherein said interior wing includes a boss with a point of the boss oriented toward the interior layer of glass.

10. The glazing as claimed in claim 9, wherein said boss has a Shore A hardness between 45 and 95 inclusive.

11. The glazing as claimed in claim 1, wherein the at least one exterior covering includes an interior tongue situated between the two profiled bodies.

12. The glazing as claimed in claim 1, wherein one of said two profiled bodies includes a lateral tongue.

13. The glazing as claimed in claim 1, wherein each of said two profiled bodies is fixed to only one of said two contiguous windows.

14. The glazing as claimed in claim 1, wherein said two profiled bodies are both fixed to a single window and said glazing includes a single exterior covering that has an exterior face that is situated in continuity with said exterior faces of said two contiguous windows.

15. A window for glazing as claimed in claim 1, comprising at least one profiled body situated in contact against a part of the edge surface of the window and at least one exterior covering that is situated farther toward the exterior than said profiled body and an exterior covering of which is situated against a part of the edge surface and has an exterior face that is situated in continuity with the exterior face of the window, said exterior covering being flexible, with a Shore A hardness between 45 and 90 inclusive.

16. The window as claimed in claim 15, further comprising two profiled bodies, wherein only one of the two profiled bodies is in contact against a part of the edge surface of the window.

17. The window as claimed in claim 15, wherein the Shore A hardness is between 55 and 85 inclusive.

18. The window as claimed in claim 16, wherein only one exterior covering has an exterior face that is situated in continuity with the exterior face of the window.

19. The glazing as claimed in claim 1, wherein the glazing is a vehicle glazing.

20. The glazing as claimed in claim 1, wherein the Shore A hardness is between 55 and 85 inclusive.

* * * * *